A. GRIMM.
BOOKMARK.
APPLICATION FILED AUG. 30, 1921.
1,415,631. Patented May 9, 1922.
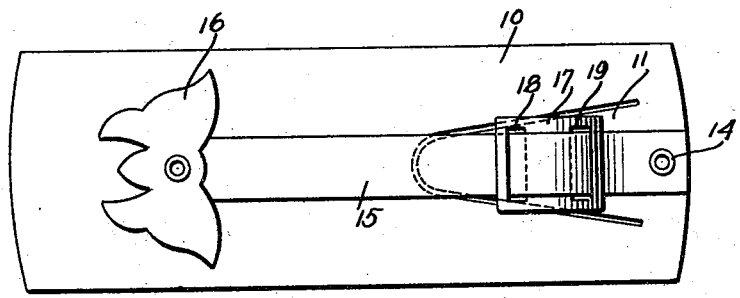
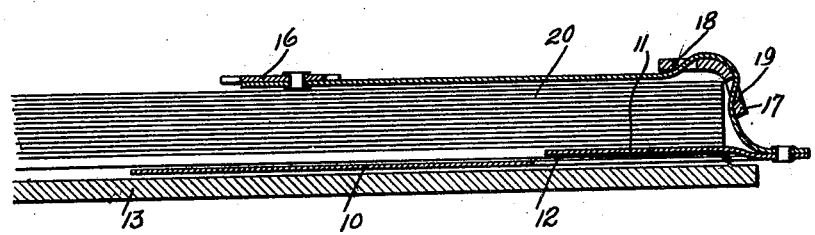
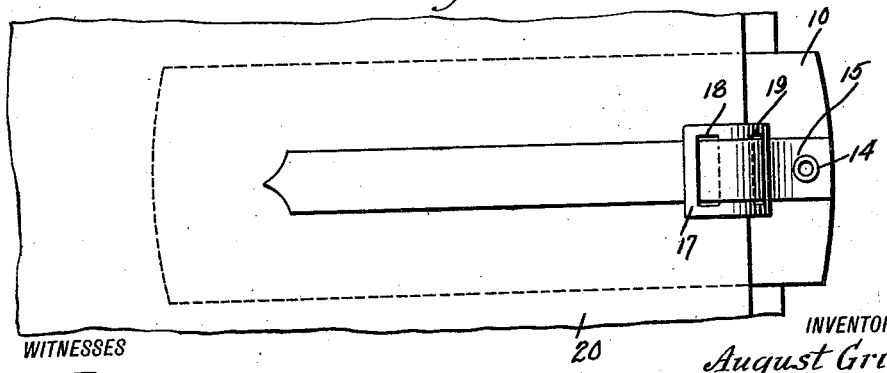
WITNESSES
Edw. Thorpe
C. W. Savage
INVENTOR
August Grimm
BY
ATTORNEYS

UNITED STATES PATENT OFFICE.

AUGUST GRIMM, OF NEWARK, NEW JERSEY.

BOOKMARK.

1,415,631. Specification of Letters Patent. Patented May 9, 1922.

Application filed August 30, 1921. Serial No. 496,891.

*To all whom it may concern:*

Be it known that I, AUGUST GRIMM, a citizen of Esthonia, and a resident of Newark, in the county of Essex and State of New Jersey, have invented a new and Improved Bookmark, of which the following is a full, clear, and exact description.

This invention relates to bookmarks.

The object of the invention is to provide a bookmark that may be attached to the book and which is provided with means for indicating any desired page so that it may be easily located.

A further object is the provision of a bookmark, which has, integral with the pointer for indicating the page, either a design or a disk-shaped portion of any shape on which advertising matter may be stamped.

These and other objects of the invention will be more clearly understood from the following detailed description and accompanying drawings.

Figure 1 is a plan view of the bookmark;

Figure 2 is a side elevation showing the bookmark attached to a book; and

Figure 3 is a top plan view showing the bookmark attached to a book.

Referring to the above-mentioned drawings, a main plate 10 has a tongue 11 cut near one end. This tongue is for attaching the main plate to the leaves of the book. As shown in Figure 2, the main plate 10 is inserted under a leaf 12 of the book 13 and the tongue 11 fits over the leaf 12. Thus the main plate is held in position in the book 13. Attached to the main plate 10 by an eye 14 is a pointer 15. This pointer may be attached to the main plate in a variety of other ways. The pointer 15 is flexible and preferably transparent. Integral with the free end of the pointer is a portion 16 which may be cut of any suitable design and may be used to carry advertising matter.

Slidably mounted on the pointer 15 is a buckle 17 provided with two slits 18 and 19 through which the flexible pointer 15 slides. This buckle serves to bend the pointer so that one portion of the pointer extends approximately at right angles to the other. The purpose of this is to so shape the pointer that it will conform to the shape of the leaf deck 20 of the book 13. The portion of the pointer 15 to which the disk-shaped portion 16 is attached rests on the upper leaf of the leaf deck of the book and serves as a marking means when the book is closed or as a means for holding the leaf in position when the book is open. In turning the leaves over when the top leaf is drawn from under the pointer it immediately falls on the next leaf and prevents it from turning over.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims.

1. A bookmark of the class described comprising a main plate, a tongue cut in the plate for attaching it to the leaves in the book, a flexible pointer attached to the plate, and means in conjunction with the pointer for bending it to fit over the edge of the leaf deck of the book.

2. A bookmark of the class described comprising a main plate, a tongue cut in the main plate for attaching it to the leaves, a flexible pointer attached to the main plate, and a buckle slidably mounted on the pointer for bending it to conform to the shape of the corner of the leaf deck.

3. As a new article of manufacture a bookmark of the class described comprising a main plate, means integral with said plate for attaching it to the leaves of the book, a flexible pointer having one end attached to the said plate, a plate of any shape or size on which advertising matter may be marked integral with said pointer, and a buckle slidably mounted on the pointer to bend it to fit a corner of the leaf deck of the book.

AUGUST GRIMM.